(12) United States Patent
Ichiryu (10) Patent No.: US 8,038,377 B2
(45) Date of Patent: Oct. 18, 2011

(54) FASTENING DEVICE

(75) Inventor: Taku Ichiryu, Akashi (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 212 days.

(21) Appl. No.: 12/232,180

(22) Filed: Sep. 11, 2008

(65) Prior Publication Data

US 2009/0067947 A1    Mar. 12, 2009

(51) Int. Cl.
*F16B 33/00*   (2006.01)

(52) U.S. Cl. .................................. 411/366.1; 411/366.2

(58) Field of Classification Search .................. 411/366, 411/424, 366.1, 103, 166, 172, 174, 177
See application file for complete search history.

(56) References Cited

U.S. PATENT DOCUMENTS

| | | | | |
|---|---|---|---|---|
| 2,335,744 A * | 11/1943 | Curtis | ............................ | 403/259 |
| 3,962,843 A * | 6/1976 | King, Jr. | ........................ | 403/243 |
| 4,005,740 A * | 2/1977 | Villo et al. | ..................... | 411/167 |
| 4,455,801 A * | 6/1984 | Merritt | ........................ | 52/309.9 |
| 4,828,441 A * | 5/1989 | Frasca | ........................... | 411/183 |
| 5,295,773 A * | 3/1994 | Amoroso | ..................... | 411/80.2 |
| 5,779,416 A * | 7/1998 | Sternitzky | .................... | 411/411 |
| 5,992,405 A * | 11/1999 | Sollami | ........................... | 125/36 |
| 6,199,453 B1 * | 3/2001 | Steinbock | .................... | 81/57.38 |
| 6,381,827 B1 * | 5/2002 | Steinbock | ....................... | 29/452 |
| 6,394,722 B1 * | 5/2002 | Kunt et al. | ....................... | 411/82 |
| 6,488,458 B2 * | 12/2002 | Ninomiya et al. | ............ | 411/172 |
| 6,641,326 B2 * | 11/2003 | Schilling et al. | .............. | 403/337 |

FOREIGN PATENT DOCUMENTS

| | | |
|---|---|---|
| JP | 62-3997 U | 1/1987 |
| JP | 62-49013 U | 3/1987 |
| JP | 11-14299 A | 1/1999 |
| JP | 2001-65586 A | 3/2001 |
| JP | 2002-195222 A | 7/2002 |
| JP | 2008-128292 A | 6/2008 |

OTHER PUBLICATIONS

Japanese Office Action dated Sep. 28, 2010, issued in corresponding Japanese Patent Application No. 2006-311524. (Partial Translation).

* cited by examiner

*Primary Examiner* — Gary Estremsky
(74) *Attorney, Agent, or Firm* — Westerman, Hattori, Daniels & Adrian, LLP (57) ABSTRACT

There is provided a fastening device in which the tightening load at the engaged portion between the thread of a nut and the thread of a bolt can be made uniform along the length of the threads, the circumferential load distribution at the end of the engagement of the bolt can also be made uniform, and concentration of a stress in the vicinity of the beginning of the engagement can be reduced. The fastening device includes an object to be fastened, having a nut hole; a nut having, at one end, a female screw portion to be fitted in the nut hole and configured such that the center of gravity is located in the nut hole; and a bolt having, at one end, a male screw portion to be screwed into the female screw portion.

5 Claims, 10 Drawing Sheets

DIRECTION IN WHICH LOAD DECREASES

MAXIMUM CIRCUMFERENTIAL LOAD POSITION

FASTENING DEVICE

BACKGROUND OF THE INVENTION

1. Field of the Invention

The present invention relates to fastening devices applied to rotary machines such as gas turbines and steam turbines and, in particular, to a fastening device applied to a portion of a rotary machine that is acted on by a centrifugal force in the direction perpendicular (orthogonal) to a fastening direction.

This application is based on Japanese Unexamined Patent Application, Publication No. 2008-128292, the content of which is incorporated herein by reference.

2. Description of Related Art

A known example of a fastening device applied to a portion of a rotary machine that is acted on by a centrifugal force in the direction perpendicular to a fastening direction is disclosed in Japanese Unexamined Patent Application, Publication No. 2001-65586.

However, the fastening device disclosed in Japanese Unexamined Patent Application, Publication No. 2001-65586 has a problem in that the contact pressure generated between the back surface of a nut located radially outside and the surface of an object to be fastened, opposing this back surface, is increased and the contact pressure generated between the back surface of the nut located radially inside and the surface of the object to be fastened, opposing this back surface, is decreased by a centrifugal force that acts on the nut. This increases the tightening load at the engaged portion between the thread of the nut and the thread of a fastening bolt at the beginning of the engagement and decreases it at the end of the engagement, making it uneven along the length of the thread, so that a stress is concentrated in the vicinity of the beginning of the engagement.

A load distribution will be described with reference to FIGS. 9 and 10 in the case where a bending moment due to a tensile stress and a centrifugal force acts on a fastening bolt.

Figure 9:
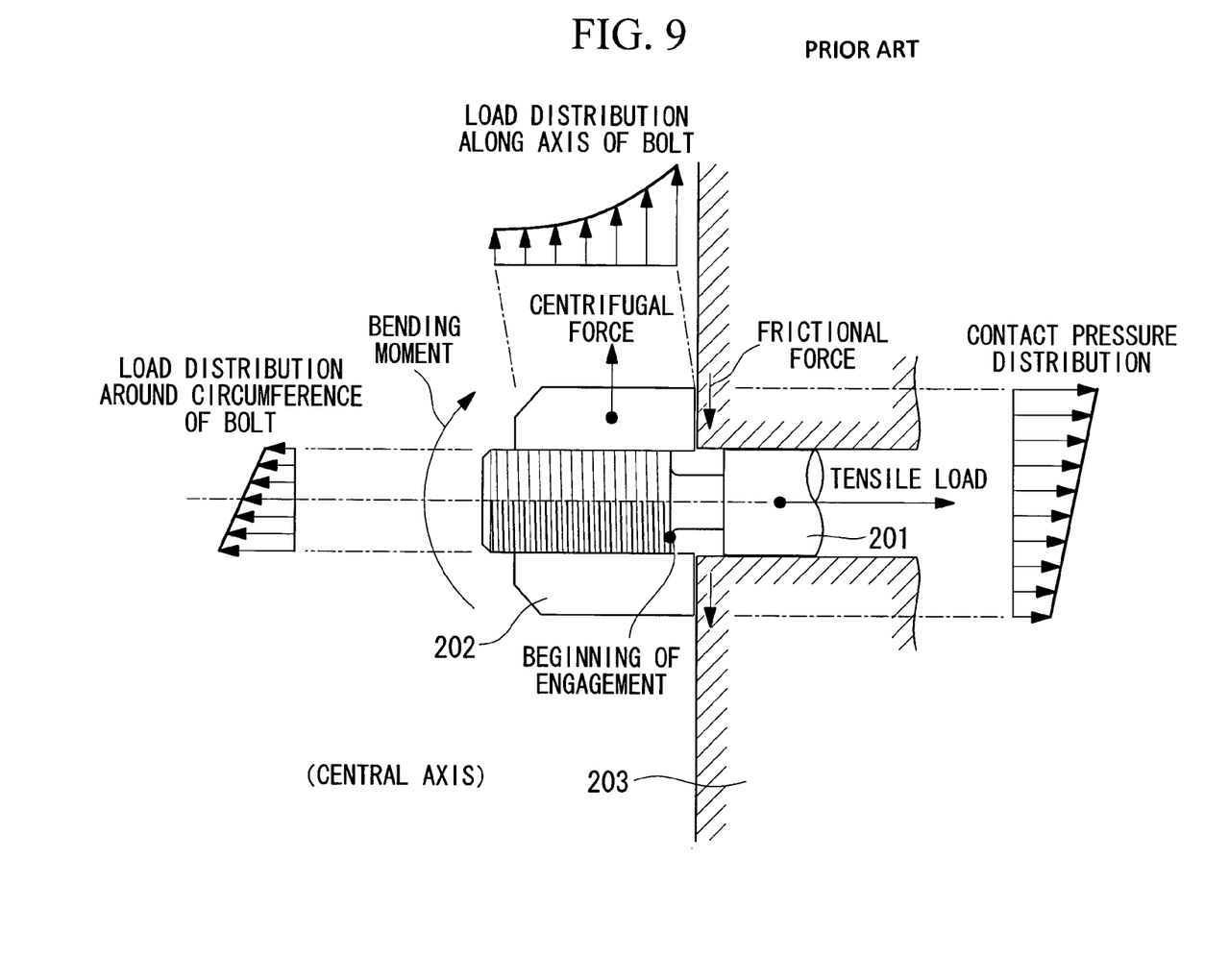
FIG. 9 is a diagram for describing a load distribution when a tensile stress and a bending force due to a centrifugal force act on a fastening bolt.
Figure 10:
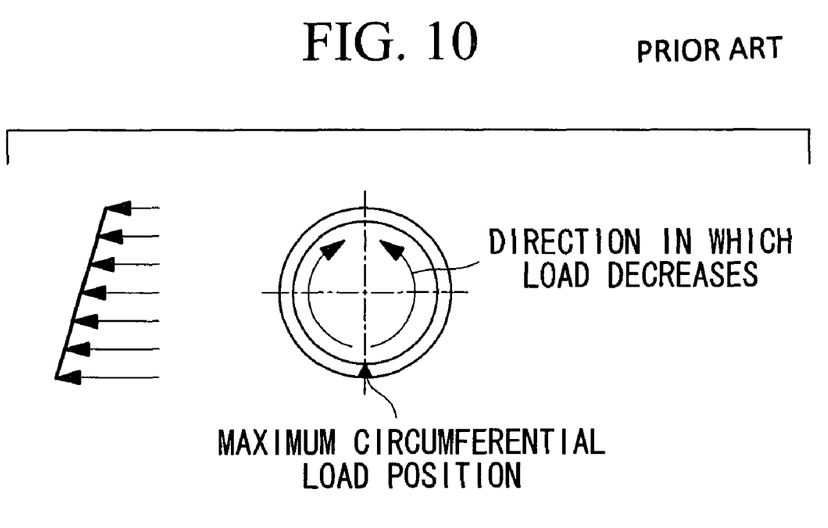
FIG. 10 is a diagram for describing a load distribution when a tensile stress and a bending force due to a centrifugal force act on a fastening bolt.

As shown at the upper part in FIG. 9, when a simple tensile load acts on a fastening bolt 201, a load distribution is generated along the axis of the fastening bolt 201. In this case, the maximum load acts at the beginning of the engagement (the starting point of the engagement) of the fastening bolt 201, at which the maximum stress is applied. When a centrifugal force further acts in this state, a bending moment due to the centrifugal force of a nut 202 exerts a raising action on the fastening bolt 201. Therefore, as shown at the left of FIG. 9 and FIG. 10, an uneven circumferential load distribution is generated at the end of the engagement (engaging end) of the fastening bolt 201. FIG. 10 shows a load distribution of the fastening bolt 201 in a cross-sectional view.

On the other hand, the nut 202 is acted on by a tightening force between it and an object to be fastened 203, so that the centrifugal force of the nut 202 is offset against a frictional force due to this tightening force. Its contact pressure exhibits the distribution as shown in the right of FIG. 9. If the centrifugal force of the nut 202 is larger than the frictional force, the excess centrifugal force acts to push the thread of the fastening bolt 201 upward and is transmitted to the fastening bolt 201. This pushing force becomes a maximum at the 6° clockwise position of the fastening bolt 201 in a cross-sectional view. This excess centrifugal force is finally transmitted to the main body of the fastening bolt 201 as a shearing force that acts on the cross section of the fastening bolt 201 at the beginning of the engagement. These pushing force and shearing force that act on the screw surface are factors causing an increase in the degree of concentration of the stress at the maximum contact pressure load position shown at the right of FIG. 9.

BRIEF SUMMARY OF THE INVENTION

The present invention is made in view of the above circumstances. Accordingly, it is an object of the present invention to provide a fastening device in which the tightening load at the engaged portion between the thread of a nut and the thread of a bolt can be made uniform along the length of the threads, the circumferential load distribution at the end of the engagement of the bolt can also be made uniform, and concentration of a stress in the vicinity of the beginning of the engagement can be reduced.

The present invention adopts the following solutions to solve the above problems.

A fastening device according to the present invention includes an object to be fastened, having a nut hole; a nut having, at one end, a female screw portion to be fitted in the nut hole and configured such that the center of gravity is located in the nut hole; and a bolt having, at one end, a male screw portion to be screwed into the female screw portion.

This fastening device is constructed such that most of the nut is disposed (placed) in the nut hole formed in the fastened object, so that the center of gravity of the entire nut is located in the nut hole, that is, inside (in the interior of) the fastened object. Therefore, a centrifugal force that acts on the nut is transmitted directly to the fastened object through the nut hole.

Furthermore, most of the nut is disposed (placed) in the nut hole formed in the fastened object. This can reduce the height (the width) of the nut protruding from the fastened object and reduce a bending moment that acts on the nut protruding from the fastened object when a centrifugal force acts.

Moreover, since the bending moment that acts on the nut protruding from the fastened object when a centrifugal force acts can be reduced, an increase in contact pressure generated between the back surface of the nut located radially outside and the surface of the fastened object opposing the back surface can be reduced and, a decrease in the contact pressure generated between the back surface of the nut located radially inside and the surface of the fastened object opposing the back surface can be reduced.

This allows the tightening load at the engaged portion between the thread of the male screw portion and the thread of the female screw portion to be distributed uniformly along the lengths of the threads and can reduce the concentration of a stress onto the vicinity of the beginning of the engagement of the engaged portion, thereby improving the reliability of the fastening device.

In the fastening device, it is more preferable that the nut include a supporting portion that supports the one end of the bolt with the female screw portion.

This fastening device is constructed such that the female screw portion and the supporting portion of the nut is provided between one end of the bolt and the fastened object and, when a centrifugal force acts, one end of the bolt is supported by the female screw portion and the supporting portion of the nut, and part of the centrifugal force that acts on the bolt is transmitted directly to the fastened object through the female screw portion and the supporting portion of the nut.

This can reduce the bending of one end of the bolt due to the centrifugal force and can make the tightening force at the engaged portion between the thread of the male screw portion and the thread of the female screw portion more uniform along the lengths of the threads.

In the fastening device, it is more preferable that the supporting portion be provided continuously around the inner circumferential surface of the nut hole.

This fastening device allows the nut to be tightened to the bolt without concern for the position of the supporting portion, thus improving the efficiency of fastening work and reducing man hours.

In the fastening device, it is more preferable that the supporting portion be configured to be detachably attached to the female screw portion.

This fastening device is constructed such that when the thread is formed on the inner circumferential surface of the tapered female screw portion, the supporting portion can be removed from the female screw portion, thus facilitating processing of the inner circumferential surface of the female screw portion.

This can increase the efficiency of the processing work, thereby reducing man hours.

In the fastening device, it is more preferable that the outer circumferential end of the female screw portion located in the vicinity of the beginning of the engagement between the female screw portion and the male screw portion be cut off so as to form a space between the outer circumferential surface and the inner circumferential surface of the nut hole.

This fastening device is constructed such that the beginning of the engagement between the female screw portion and the male screw portion is configured to easily stretch when the nut is pulled in the axial direction.

This can reduce the tightening load in the vicinity of the beginning of the engagement when the nut is fastened to the bolt, uniformly distribute the tightening load at the engaged portion between the thread of the male screw portion and the thread of the female screw portion along the lengths of the threads, and reduce the concentration of a stress onto the vicinity of the beginning of the engagement at the engaged portion, thereby improving the reliability of the fastening device.

Since a rotary machine according to the present invention includes a highly reliable fastening device, the reliability of the rotary machine can be improved and the interval between maintenance inspections can be increased, thus reducing maintenance inspection costs.

The present invention provides the advantages of making the tightening load at the engaged portion between the thread of the nut and the thread of the bolt uniform along the lengths of the threads, and reducing concentration of a stress onto the beginning of the engagement.

A first embodiment of a fastening device according to the present invention will be described with reference to FIGS. 1 to 3.

Figure 1:
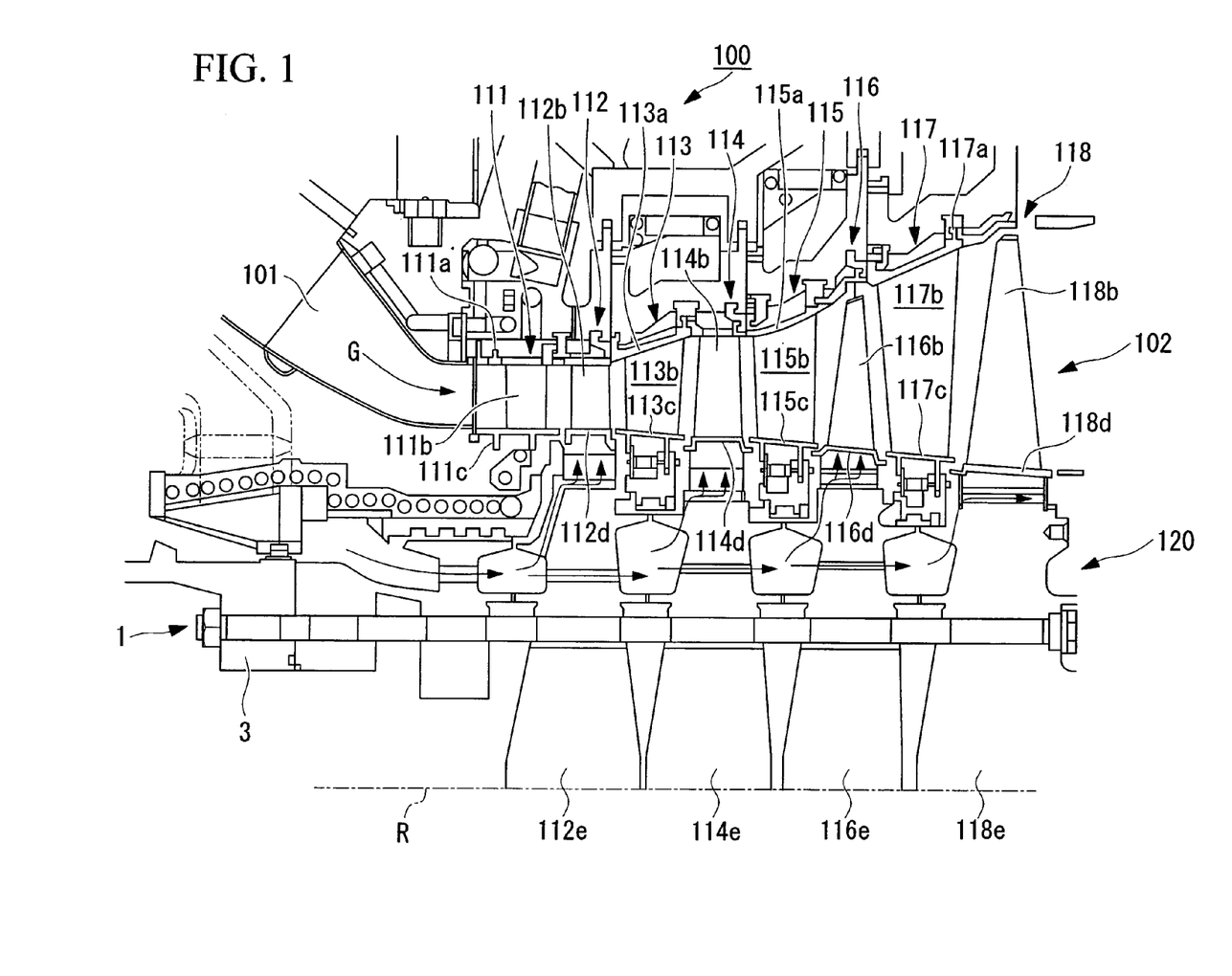
FIG. 1 is a schematic structural diagram of essential parts of a gas turbine equipped with a fastening device according to a first embodiment of the present invention.

FIG. 1 is a schematic structural diagram of essential parts of a turbine (hereinafter referred to as a "gas turbine") 100 equipped with a fastening device 1 of this embodiment; FIGS. 2A and 2B are enlarged views of essential parts of the fastening device 1 shown in FIG. 1, wherein FIG. 2A is a sectional view thereof and FIG. 2B is a cross-sectional view taken along line II-II of FIG. 2A; and FIG. 3 is a perspective view of the fastening device 1 shown in FIG. 1 and FIGS. 2A and 2B.

As shown in FIG. 1, the gas turbine (rotary machine) 100 is mainly composed of a compressor (not shown) that compresses combustion air and sends it to a combustor 101, the combustor 101 that ejects fuel into the combustion air sent from the compressor to burn it, thereby generating high-temperature combustion gas G, and a turbine section 102 located downstream of the combustor 101 and driven by the combustion gas G discharged from the combustor 101.

The turbine section 102 has, for example, a first-row (row 1) stationary blade 111, a first-row moving blade 112, a second-row (row 2) stationary blade 113, a second-row moving blade 114, a third-row (row 3) stationary blade 115, a third-row moving blade 116, a fourth-row (row 1) stationary blade 117, and a fourth-row moving blade 118 disposed in sequence from the upstream side.

The first-row stationary blade 111, the second-row stationary blade 113, the third-row stationary blade 115, and the fourth-row stationary blade 117 have outer shrouds 111a, 113a, 115a, and 117a; stationary blade main bodies 111b, 113b, 115b, and 117b having a blade-shaped cross section; and inner shrouds 111c, 113c, 115c, and 117c, respectively, and are fixed to a stator-side casing (not shown) with the outer shrouds 111a, 113a, 115a, and 117a, respectively.

The first-row stationary blade 111, the second-row stationary blade 113, the third-row stationary blade 115, and the fourth-row stationary blade 117 work to expand and decompress the combustion gas G and to direct the gas flowing from the stationary blades 111, 113, 115, and 117 so as to collide with the moving blades 112, 114, 116, and 118, located downstream, at an optimum angle.

The first-row moving blade 112, the second-row moving blade 114, the third-row moving blade 116, and the fourth-row moving blade 118 have moving-blade main bodies 112b, 114b, 116b, and 118b, respectively, and are mounted to moving-blade disks 112e, 114e, 116e, and 118e with platforms 112d, 114d, 116d, and 118d fixed to their individual proximal ends, respectively.

These moving-blade disks (fastened objects) 112e, 114e, 116e, and 118e extend along a rotation axis R and are fastened together by a plurality of (for example, 12) fastening devices 1 disposed circumferentially to constitute a turbine rotor 120.

Here, the flow of the combustion gas G will be described. The combustion gas G that has been burned to high temperature by the combustor 101 flows first to the first-row stationary blade 111 and expands while flowing through the second- to fourth-row blades to rotate the moving blades 112, 114, 116, and 118, to apply rotational force to the turbine rotor 120, and is then discharged.

Figure 2A:
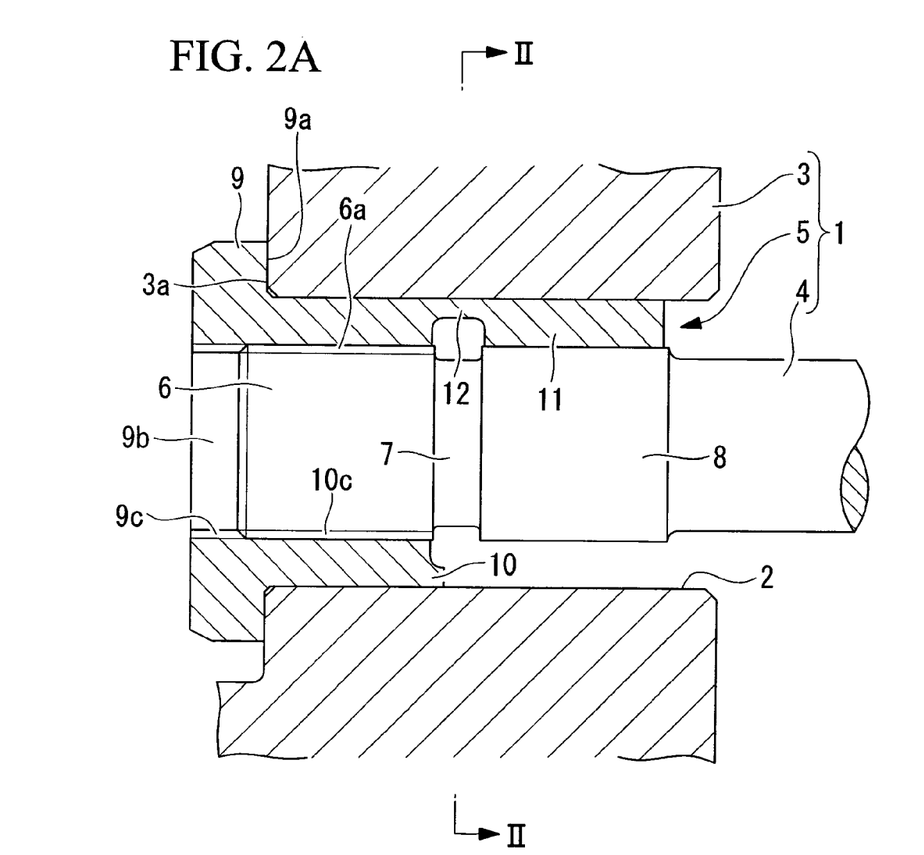
FIG. 2A is an enlarged sectional view of essential parts of the fastening device shown in FIG. 1.
Figure 2B:
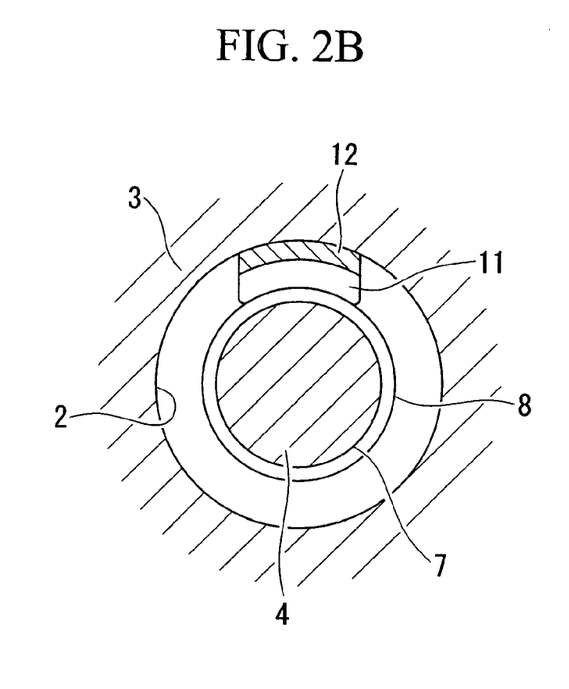
FIG. 2B is a cross-sectional view taken along line II-II of FIG. 2A.

As shown in FIGS. 2A and 2B, the fastening device 1 of this embodiment is mainly composed of a fastened object 3 having a nut hole 2, a bolt 4, and a nut 5.

As shown in FIG. 1, the fastened object 3 constitutes the turbine rotor 120 together with the moving-blade disks 112e, 114e, 116e, and 118e and is disposed at one end of the turbine rotor 120 in the axial direction (at the left end (adjacent to the compressor) in FIG. 1). The nut holes 2 are through-holes that penetrate through the fastened object 3 in the plate thickness direction (in the axial direction) and have a circular cross section (in plan view), which are arranged in multiple locations (for example, 12 locations) around the circumference.

Figure 4:
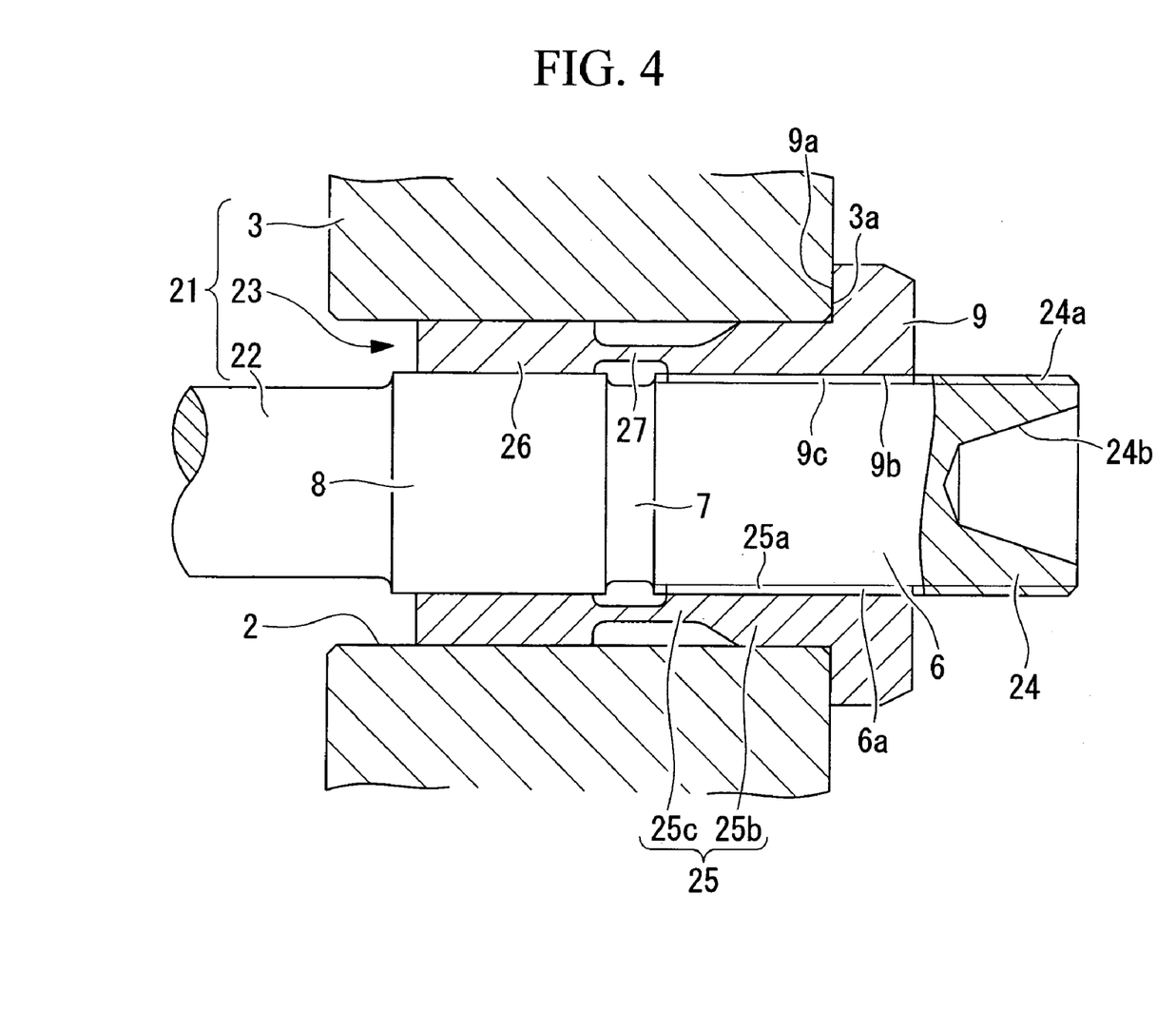
FIG. 4 is an enlarged sectional view of essential parts of a second embodiment of the fastening device of the present invention.

The bolt 4 is a circular-cross-section (in plan view) rod-shaped member having a male screw portion 6 at one end (at the left end (adjacent to the compressor) in FIG. 1), a constricted neck portion 7 that continues from the male screw portion 6, and a nut contact portion 8 that continues from the neck portion 7. The outer circumferential surface of the male screw portion 6 has a thread 6a. The other end of the bolt 4 is constructed as shown in FIG. 4, for example.

The nut contact portion 8 is formed such that the outside diameter is a little larger than the outside diameter of the male screw portion 6 from one end to the other end.

Figure 3:
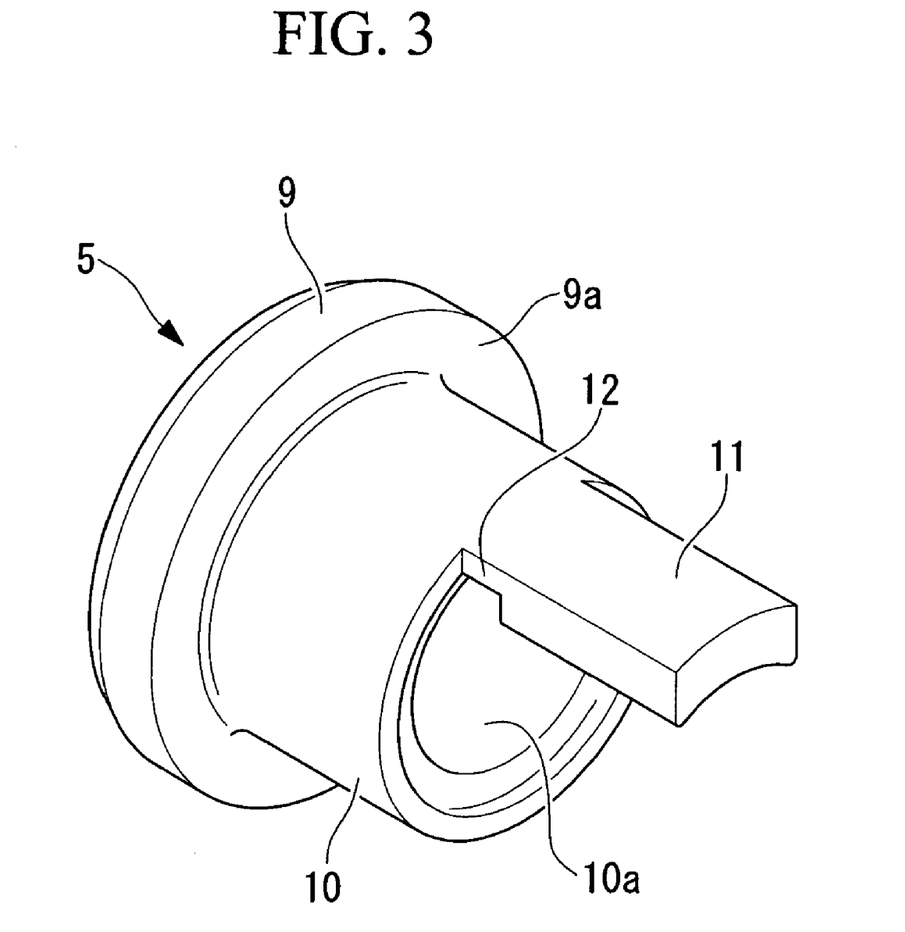
FIG. 3 is a perspective view of the fastening device shown in FIG. 1 and FIGS. 2A and 2B.

As shown in FIGS. 2A, 2B, and 3, the nut 5 has a collar 9 having an outside diameter larger than the inside diameter of the nut hole 2, a female screw portion 10 that continues from the collar 9 to be screwed onto the male screw portion 6 of the bolt 4, a tongue portion (a supporting portion) 11 that continues from the female screw portion 10, and a joint portion 12 that joins (connects) the female screw portion 10 and the tongue portion 11 together.

The back surface 9a of the collar 9 (that is, the surface opposing a surface 3a of the fastened object 3) and the surface 3a of the fastened object 3 opposing the back surface 9a each have a smooth bearing surface. When the bolt 4 and the nut 5 are fastened together, the fastened object 3 and the nut 5 come into contact with each other with the bearing surfaces therebetween. The collar 9 has, radially inside, a circular-cross-section (in plan view) through-hole 9b that penetrates through the nut 5 in the plate thickness direction (in the axial direction). The inner circumferential surface of the through-hole 9b has a thread 9c extending from a thread 10a formed in the inner circumferential surface of the female screw portion 10.

The inner circumferential surface of the female screw portion 10 has the thread 10a that is to be screwed onto a thread 6a of the male screw portion 6. The female screw portion 10 is formed so that the outside diameter thereof is substantially the same as the inside diameter of the nut hole 2 from one end to the other end. That is, the female screw portion 10 is formed so as to be (completely) fitted in the nut hole 2.

The tongue portion 11 is an arc-shaped cross-section member having a substantially rectangular shape in plan view which supports the outer circumferential surface of the nut contact portion 8 along the whole length of the nut contact portion 8 (in the axial direction) and partially around the circumference of the nut contact portion 8 (in the direction perpendicular to the axis). When the bolt 4 and the nut 5 are fastened together, the tongue portion 11 is located at the side where a centrifugal force that acts on the bolt 4 is received, that is, radially outside.

The joint portion 12 is a member that joins the outer circumferential end of the female screw portion 10 and the outer circumferential end of the tongue portion 11 together and has substantially the same width as the tongue portion 11.

The curvatures of the outer circumferential surfaces of the tongue portion 11 and the joint portion 12 are set to be substantially the same as the curvature of the outer circumferential surface of the female screw portion 10, that is, the curvature of the inner circumferential surface of the nut hole 2. The curvature of the inner circumferential surface of the tongue portion 11 is set to be substantially the same as that of the outer circumferential surface of the nut contact portion 8. The inner circumferential surface of the nut hole 2, the outer circumferential surface of the female screw portion 10, the outer circumferential surface of the tongue portion 11, the outer circumferential surface of the joint portion 12, the inner circumferential surface of the tongue portion 11, and the outer circumferential surface of the nut contact portion 8 are each formed into a smooth bearing surface.

The fastening device 1 according to this embodiment is constructed such that most of the nut 5 is disposed (placed) in the nut hole 2 formed in the fastened object 3, so that the center of gravity of the entire nut 5 is located in the nut hole 2, that is, inside (in the interior of) the fastened object 3. Therefore, a centrifugal force that acts on the nut 5 is transmitted to the fastened object 3 through the female screw portion 10, the tongue portion 11, and the joint portion 12.

Furthermore, most of the nut 5 is disposed (placed) in the nut hole 2 formed in the fastened object 3. This can reduce the height (the width) of the collar 9 of the nut 5 and reduce a bending moment that acts on the collar 9 of the nut 5 when a centrifugal force acts (practically, prevent the bending moment due to the centrifugal force from acting on the surface (the bearing surface 3a).

Moreover, since the bending moment that acts on the collar 9 of the nut 5 when a centrifugal force acts can be reduced, an increase in contact pressure generated between the back surface 9a of the collar 9 located radially outside and the surface 3a of the fastened object 3 opposing the back surface 9a can be reduced and, a decrease in the contact pressure generated between the back surface 9a of the collar 9 located radially inside and the surface 3a of the fastened object 3 opposing the back surface 9a can be reduced.

This allows the tightening load at the engaged portion between the thread 6a of the male screw portion 6 and the thread 10a of the female screw portion 10 (hereinafter referred to as "an engaged portion") to be distributed uniformly along the lengths of the threads 6a and 10a and can reduce the concentration of a stress onto the vicinity of the beginning of the engagement of the engaged portion, thereby improving the reliability of the fastening device 1.

The fastening device 1 according to this embodiment is constructed such that the distance between the back surface 9a of the collar 9 located radially outside and the surface 3a of the fastened object 3 opposing the back surface 9a at which contact pressure increases when a centrifugal force acts and the threads 6a and 10a and the distance between the back surface 9a of the collar 9 located radially inside and the surface 3a of the fastened object 3 opposing the back surface 9a at which contact pressure decreases when a centrifugal force acts and the threads 6a and 10a are separated, respectively, by a distance corresponding to at least the thickness of the female screw portion 10. This can make the tightening force at the engaged portion between the thread 6a of the male screw portion 6 and the thread 10a of the female screw portion 10 more uniform along the lengths of the threads 6a and 10a.

With the fastening device 1 according to this embodiment, the tongue portion 11 of the nut 5 is provided between the nut contact portion 8 of the bolt 4 and the fastened object 3 and, when a centrifugal force acts, the nut contact portion 8 of the bolt 4 is supported by the tongue portion 11 of the nut 5 and part of the centrifugal force that acts on the bolt 4 is transmitted to the fastened object 3 through the tongue portion 11.

This can reduce the bending of one end of the bolt 4 due to the centrifugal force and can make the tightening force at the engaged portion between the thread 6a of the male screw portion 6 and the thread 10a of the female screw portion 10 more uniform along the lengths of the threads 6a and 10a.

A second embodiment of the fastening device of the present invention will be described with reference to FIG. 4.

The fastening device 21 according to this embodiment is different from that of the first embodiment in that a bolt 22 is provided in place of the bolt 4 and a nut 23 is provided in place of the nut 5. The other components are the same as those of the first embodiment, so that descriptions of those components will be omitted here.

The same components as those of the first embodiment are given the same reference numerals.

The bolt 22 is a circular-cross-section (in plan view) rod-shaped member having an excess portion 24 at one end (at the right end in FIG. 4), the male screw portion 6 that continues from the excess portion 24, the constricted neck portion 7 that continues from the male screw portion 6, and the nut contact portion 8 that continues from the neck portion 7.

The excess portion 24 is formed such that the outside diameter is substantially the same as the outside diameter of the male screw portion 6 from one end to the other end. The outer circumferential surface of the excess portion 24 has a thread 24a the same as the thread 6a formed on the outer circumferential surface of the male screw portion 6. The excess portion 24 has a hole 24b from its end face to the male screw portion 6. This hole 24b is provided to reduce a centrifugal force that acts on the bolt 24 and can be omitted. The excess portion 24 is provided to mount the end of a jack (not shown) for pulling the bolt 22 in the axial direction when the nut 23 is fastened to the bolt 22.

The nut 23 has the collar 9 having an outside diameter larger than the inside diameter of the nut hole 2, a female screw portion 25 that continues from the collar 9 to be screwed onto the male screw portion 6 of the bolt 22, a supporting portion 26 that continues from the female screw portion 25, and a joint portion 27 that joins the female screw portion 25 and the supporting portion 26 together.

The back surface 9a of the collar 9 (that is, the surface opposing the surface 3a of the fastened object 3) and the surface 3a of the fastened object 3 opposing the back surface 9a each have a smooth bearing surface. When the bolt 22 and the nut 23 are fastened together, the fastened object 3 and the nut 23 come into contact with each other with the bearing surfaces therebetween. The collar 9 has, radially inside, the circular-cross-section (in plan view) through-hole 9b that penetrates through the nut 23 in the plate thickness direction (in the axial direction). The inner circumferential surface of the through-hole 9b has the thread 9c which has the same inside diameter and pitch as a thread 25a formed on the inner circumferential surface of the female screw portion 25.

The inner circumferential surface of the female screw portion 25 has the thread 25a that is to be screwed onto the thread 6a of the male screw portion 6. On the other hand, the female screw portion 25 has a fitted portion 25b that is formed such that its outside diameter is substantially the same as the inside diameter of the nut hole 2 over a predetermined length from the collar 9 toward the supporting portion 26 and a reduced-diameter portion 25c that reduces in diameter gradually toward the supporting portion 26. That is, the female screw portion 25 is formed such that the fitted portion 25b fits in the nut hole 2 and a space is formed between the outer circumferential surface of the reduced-diameter portion 25c and the inner circumferential surface of the nut hole 2.

The supporting portion 26 is a circular-cross-section hollow cylindrical member that supports the outer circumferential surface of the nut contact portion 8 along the whole length of the nut contact portion 8 (in the axial direction) and around the whole circumference of the nut contact portion 8 (in the direction perpendicular to the axis).

The joint portion 27 is a circular-cross-section hollow cylindrical member that joins the outer circumferential end of the reduced-diameter portion 25c and the center of the end face of the supporting portion 26 together.

The curvature of the outer circumferential surface of the supporting portion 26 is set to be substantially the same as the curvature of the outer circumferential surface of the fitted portion 25b, that is, the curvature of the inner circumferential surface of the nut hole 2. The inside diameter of the supporting portion 26 is set to be substantially the same as the outside diameter of the nut contact portion 8. The inner circumferential surface of the nut hole 2, the outer circumferential surface of the fitted portion 25b, the outer circumferential surface of the supporting portion 26, the inner circumferential surface of the supporting portion 26, and the outer circumferential surface of the nut contact portion 8 are each formed to be a smooth bearing surface.

The fastening device 21 according to this embodiment is constructed such that the reduced-diameter portion 25c is provided in the vicinity of the beginning of the engagement of the engaged portion and that the reduced-diameter portion 25c and the supporting portion 26 are joined together with the thin joint portion 27. In other words, the beginning of the engagement of the engaged portion of the nut 23 is configured to easily stretch when the nut 23 is pulled in the axial direction.

This can reduce the tightening load in the vicinity of the beginning of the engagement when the nut 23 is fastened to the bolt 22, uniformly distribute the tightening load at the engaged portion between the thread 6a of the male screw portion 6 and the thread 25a of the female screw portion 25 over the lengths of the threads 6a and 25a, and reduce the concentration of a stress in the vicinity of the beginning of the engagement at the engaged portion, thereby improving the reliability of the fastening device 21.

The fastening device 21 according to this embodiment has the thread 24a on the end face of the bolt 22, so that the nut 23 is fastened to the bolt 22, with the bolt 22 drawn (stretched) in the axial direction.

The reason why the nut 23 is fastened, with the bolt 22 stretched by a specified calculated amount by the jack, is to fasten the bolt 22 and the nut 9 together, with no contact pressure acting between the nut 9 and the surface 3a of the fastened object 3 and the back surface 9a, to prevent the bolt 22 from being acted on by a twisting torque.

Furthermore, the reason why the supporting portion 26 is provided continuously around the circumference is to allow the position of the nut 23 to be selected freely when the bolt 22 and the nut 9 are fastened.

The other operations and advantages are the same as those of the first embodiment, so that their descriptions will be omitted here.

Figure 5:
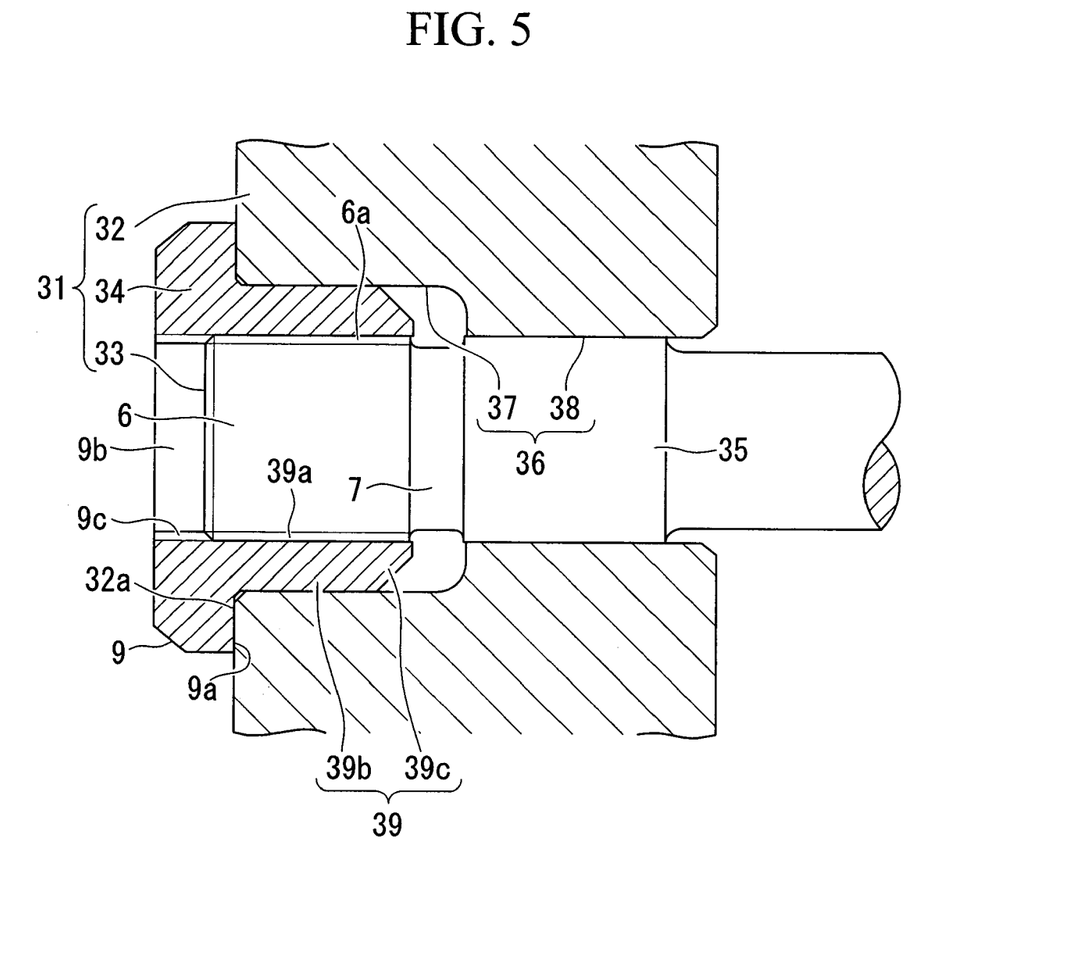
FIG. 5 is an enlarged sectional view of essential parts of a third embodiment of the fastening device of the present invention.

A third embodiment of the fastening device according to the present invention will be described with reference to FIG. 5.

The fastening device 31 according to this embodiment is different from that of the first embodiment in that a fastened object 32 is provided in place of the fastened object 3, a bolt 33 is provided in place of the bolt 4, and a nut 34 is provided in place of the nut 5. The other components are the same as those of the first embodiment, so that descriptions of those components will be omitted here.

The same components as those of the first embodiment are given the same reference numerals.

The bolt 33 is a circular-cross-section (in plan view) rod-shaped member having the male screw portion 6 at one end (at the left end in FIG. 5), the constricted neck portion 7 that continues from the male screw portion 6, and a fastened-object contact portion 35 that continues from the neck portion 7.

The fastened object 32 has a plurality of (for example, 12) circular-cross-section through-holes 36 that penetrate through the plate thickness (in the axial direction) around the circumference.

The through-holes 36 each have a nut hole 37 and a bolt hole 38 having an inside diameter smaller than the inside diameter of the nut hole 37. The bolt hole 38 is formed such that the inside diameter is substantially the same as the outside diameter of the fastened-object contact portion 35 from one end to the other end thereof. That is, the bolt hole 38 is formed so as to support the outer circumferential surface of the fastened-object contact portion 35 along the whole length of the fastened-object contact portion 35 (in the axial direction) and around the whole circumference of the fastened-object contact portion 35 (in the direction perpendicular to the axis).

The nut hole 37 and the bolt hole 38 are formed such that the central axis of the nut hole 37 and the central axis of the bolt hole 38 are located on the same line.

The nut 34 has the collar 9 having an outside diameter larger than the inside diameter of the nut hole 37 and a female screw portion 39 that continues from the collar 9 to be screwed onto the male screw portion 6 of the bolt 33.

The back surface 9a of the collar 9 (that is, the surface opposing a surface 32a of the fastened object 32) and the surface 32a of the fastened object 32 opposing the back surface 9a each have a smooth bearing surface. When the bolt 33 and the nut 34 are fastened together, the fastened object 32 and the nut 34 come into contact with each other with the bearing surfaces therebetween. The collar 9 has, radially inside, the circular-cross-section (in plan view) through-hole 9b that penetrates through the nut 34 in the plate thickness direction (in the axial direction). The inner circumferential surface of the through-hole 9b has the thread 9c which has the same inside diameter and pitch as a thread 39a formed on the inner circumferential surface of the female screw portion 39.

The inner circumferential surface of the female screw portion 39 has the thread 39a that is to be screwed onto the thread 6a of the male screw portion 6. On the other hand, the female screw portion 39 has a fitted portion 39b that is formed such that its outside diameter is substantially the same as the inside diameter of the nut hole 37 over a predetermined length from the collar 9 toward the inside (that is, toward the bolt hole 38) and a reduced-diameter portion 39c that reduces in diameter gradually toward the inside. That is, the female screw portion 39 is formed such that the fitted portion 39b fits in the nut hole 37 and so as to form a space between the outer circumferential surface of the reduced-diameter portion 39c and the inner circumferential surface of the nut hole 37.

The fastening device 31 according to this embodiment does not need (omits) the tongue portion 11 and the joint portion 12 described in the first embodiment and the supporting portion 26 and the joint portion 27 described in the second embodiment, thus simplifying the shape of the nut 34.

This can reduce number of steps needed to process the nut 34, thereby reducing the manufacturing costs of the nut 34.

The fastening device 31 according to this embodiment has the reduced-diameter portion 39c in the vicinity of the beginning of the engagement of the engaged portion. In other words, the beginning of the engagement of the engaged portion of the nut 34 is configured to be easily stretched when the nut 34 is drawn in the axial direction.

This can reduce the tightening load in the vicinity of the beginning of the engagement when the nut 34 is fastened to the bolt 33, uniformly distribute the tightening load at the engaged portion between the thread 6a of the male screw portion 6 and the thread 39a of the female screw portion 39 over the lengths of the threads 6a and 39a, and reduce the concentration of a stress in the vicinity of the beginning of the engagement at the engaged portion, thereby improving the reliability of the fastening device 31.

The other operations and advantages are the same as those of the first embodiment, so that their descriptions will be omitted here.

A fourth embodiment of the fastening device according to the present invention will be described with reference to FIG. 6.

The fastening device 41 of this embodiment is different from that of the first embodiment in that a bolt 42 is provided in place of the bolt 4 and a nut 43 is provided in place of the nut 5. The other components are the same as those of the first embodiment, so that descriptions of those components will be omitted here.

The same components as those of the first embodiment are given the same reference numerals.

This embodiment shows a case in which the end of the bolt 42 does not project from the end of the nut 43. The bolt 42 is a circular-cross-section (in plan view) rod-shaped member having a male screw portion 44 at one end (at the left end in FIG. 6), the constricted neck portion 7 that continues from the male screw portion 44, and the nut contact portion 8 that continues from the neck portion 7. The outer circumferential surface of the male screw portion 44 is formed so as to increase in effective diameter in a tapered shape from the neck portion 7 toward its end face. The outer circumferential surface of the male screw portion 44 has a thread 44a. While FIG. 6 shows the male screw portion 44 in an exaggerated tapered shape, the actual amount of the taper is nothing more than a very small change. The other end of the bolt 42 is constructed as shown in FIG. 4, for example.

The nut 43 has the collar 9 having an outside diameter larger than the inside diameter of the nut hole 2, a female screw portion 45 that continues from the collar 9 to be screwed onto the male screw portion 44 of the bolt 42, a joint portion 46 that continues from the female screw portion 45, and a supporting portion 47 that is joined (connected) to the female screw portion 45 with the joint portion 46.

The back surface 9a of the collar 9 (that is, the surface opposing the surface 3a of the fastened object 3) and the surface 3a of the fastened object 3 opposing the back surface 9a each have a smooth bearing surface. When the bolt 42 and the nut 43 are fastened together, the fastened object 3 and the nut 43 come into contact with each other with the bearing surfaces therebetween. The collar 9 has, radially inside, the circular-cross-section (in plan view) through-hole 9b that penetrates through the nut 43 in the plate thickness direction (in the axial direction).

The inner circumferential surface of the female screw portion 45 has a thread 45a that is to be screwed onto a thread 44a of the male screw portion 44. Although not shown in FIG. 6, the thread 44a of the bolt expands in a tapered shape toward the bolt end face, as described above, and the female screw portion 45 is cylindrical in shape and the thread 45a thereof is a parallel thread. That is, the bolt 42 and the nut 43 are selected to form a combination in which the engagement is shallow at the beginning of the engagement of the bolt 42 and increases in depth toward the end of the engagement (bolt end face) and the effective diameters of both threads become normal at the end of the engagement. However, since the degree of the taper of the thread 44a is very small, the female screw portion 45 and the joint portion 46 are formed so that the outside diameters thereof are substantially the same as the inside diameter of the nut hole 2 from one end to the other end. That is, the female screw portion 45 and the joint portion 46 are formed so as to be (completely) fitted in the nut hole 2.

The supporting portion 47 is a circular-cross-section hollow cylindrical member that supports the outer circumferential surface of the nut contact portion 8 along the whole length of the nut contact portion 8 (in the axial direction) and around the whole circumference of the nut contact portion 8 (in the direction perpendicular to the axis). This supporting portion 47 is constructed to be detachably attached to the female screw portion 45 with the joint portion 46 in between.

The curvature of the outer circumferential surfaces of the supporting portion 47 is set to be substantially the same as those of the outer circumferential surfaces of the female screw portion 45 and the joint portion 46, that is, the curvature of the inner circumferential surface of the nut hole 2. The curvature of the inner circumferential surface of the supporting portion 47 is set to be substantially the same as the curvature of the outer circumferential surface of the nut contact portion 8. The inner circumferential surface of the nut hole 2, the outer circumferential surface of the female screw portion 45, the outer circumferential surface of the supporting portion 47, the outer circumferential surface of the joint portion 46, the inner circumferential surface of the supporting portion 47, and the outer circumferential surface of the nut contact portion 8 are each formed into a smooth bearing surface.

The fastening device 41 according to this embodiment is constructed such that when the thread 45a is formed on the inner circumferential surface of the tapered female screw portion 45, the supporting portion 47 can be removed from the female screw portion 45, thus facilitating processing of the inner circumferential surface of the female screw portion 45.

This can increase the efficiency of the processing work, thereby reducing man hours.

The fastening device 41 according to this embodiment is constructed such that the engaged portion is tapered so that the engagement at the engaged portion is shallow at the beginning of the engagement and increases in depth at the end of the engagement.

This can reduce the tightening load in the vicinity of the beginning of the engagement when the nut 43 is fastened to the bolt 44, uniformly distribute the tightening load at the engaged portion between the thread 44a of the male screw portion 44 and the thread 45a of the female screw portion 45 along the lengths of the threads 44a and 45a, and reduce the concentration of a stress in the vicinity of the beginning of the engagement at the engaged portion, thereby improving the reliability of the fastening device 41.

Furthermore, the supporting portion 47 is provided continuously around the circumference. This allows the nut 43 to be tightened to the bolt 42 without concern for the position of the supporting portion 47, thus improving the efficiency of fastening work and reducing man hours.

The other operations and advantages are the same as those of the first embodiment, so that their descriptions will be omitted here.

Figure 6:
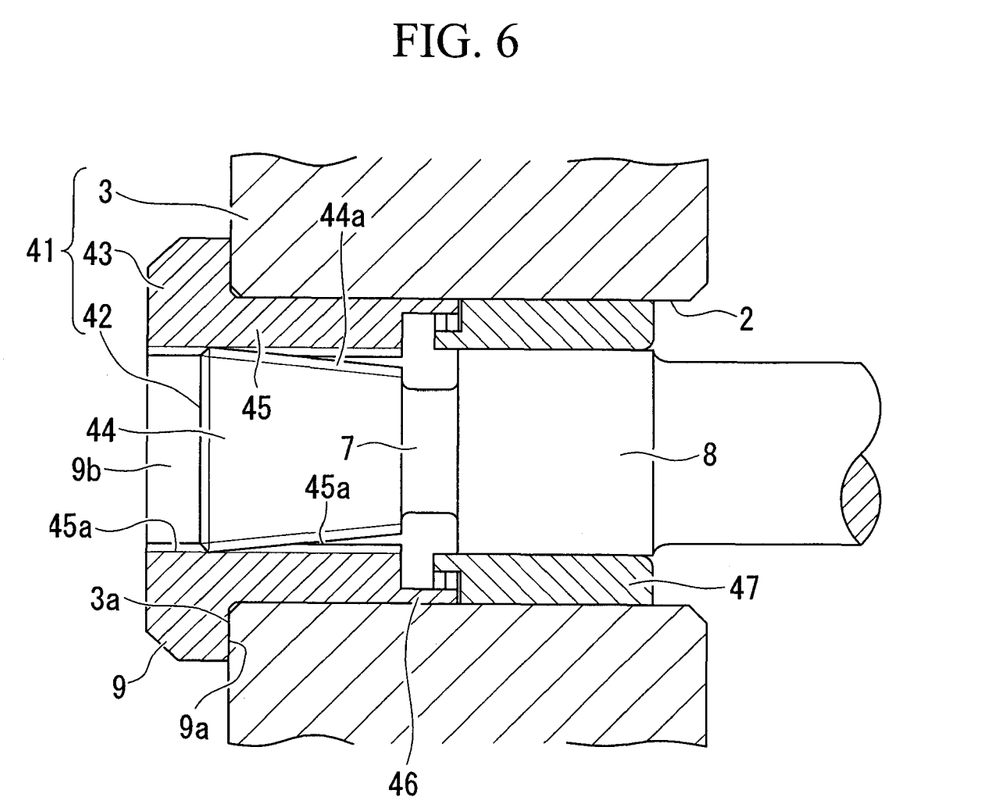
FIG. 6 is an enlarged sectional view of essential parts of a fourth embodiment of the fastening device of the present invention.

The embodiment shown in FIG. 6 shows a case in which the end of the bolt 42 does not protrude from the end of the nut 43. However, when the end of the bolt 42 protrudes from the end of the nut 43, a reverse combination is provided. That is, the thread 45a of the female screw portion 45 increases in effective diameter in a tapered shape toward the beginning of the engagement, and the male screw portion 44 is cylindrical in shape and the thread 44a thereof is formed of a parallel thread. This combination is also selected so that the engagement is shallow at the beginning of the engagement of the bolt 42 and increases in depth toward the end of the engagement (bolt end face) and the effective diameters of both threads become normal at the end of the engagement. The operations and advantages of this combination are the same as those of the embodiment shown in FIG. 6.

A fifth embodiment of the fastening device according to the present invention will be described with reference to FIG. 7.

The fastening device 51 according to this embodiment is different from that of the first embodiment in that a first bolt 52 and a second bolt 53 are provided in place of the bolt 4 and a nut 54 is provided in place of the nut 5. The other components are the same as those of the first embodiment, so that descriptions of those components will be omitted here.

The same components as those of the first embodiment are given the same reference numerals.

Figure 7:
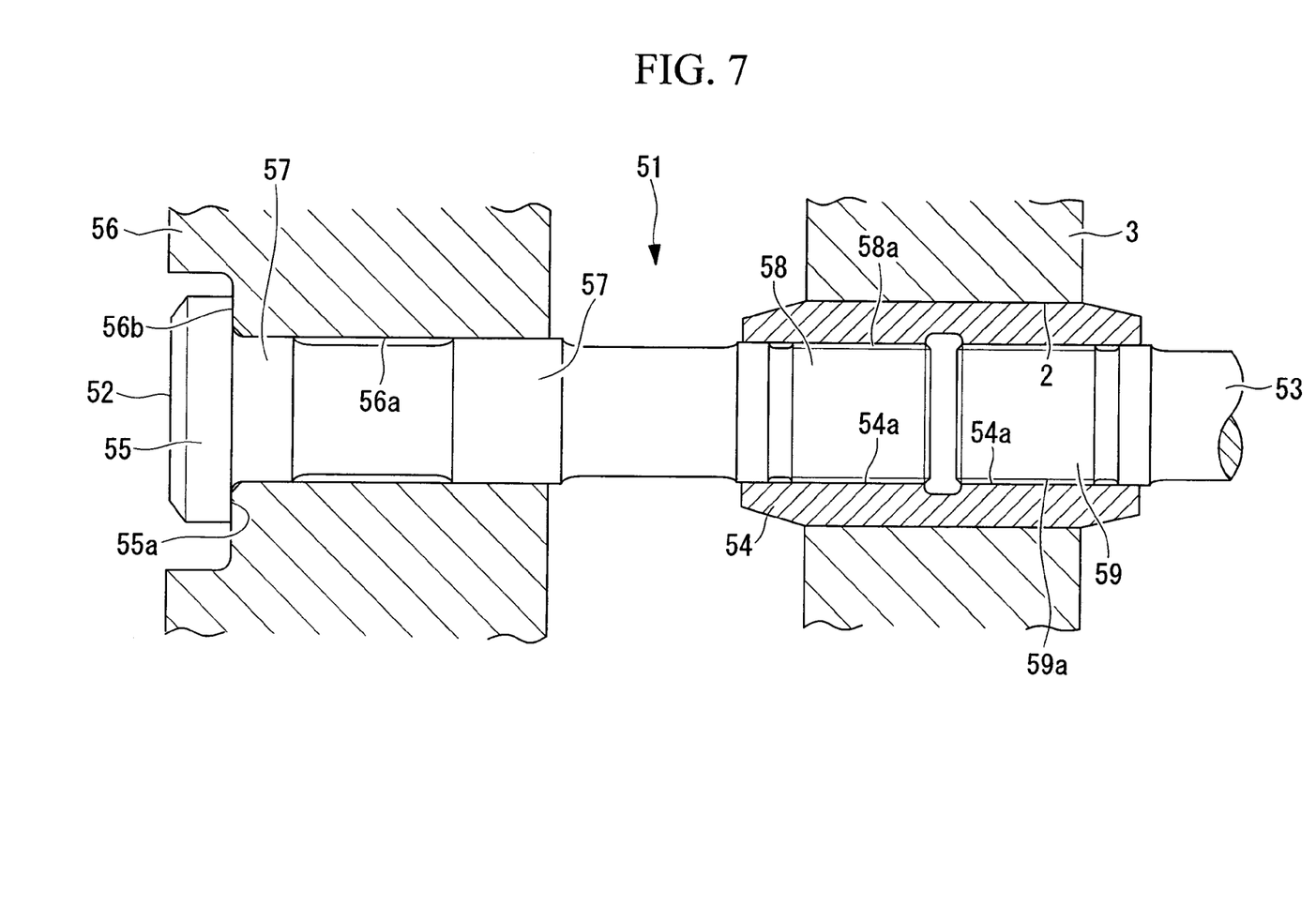
FIG. 7 is an enlarged sectional view of essential parts of a fifth embodiment of the fastening device of the present invention.

The first bolt 52 is a circular-cross-section (in plan view) rod-shaped member having a bolt head 55 at one end (at the left end in FIG. 7), a fastened-object contact portion 57 that continues from the bolt head 55 and is to be fitted in a bolt hole 56a formed in a fastened object 56, and a male screw portion 58 at the other end (at the right end in FIG. 7). The fastened-object contact portion 57 is formed such that the outside diameter is substantially the same as the inside diameter of the bolt hole 56a from one end to the other end. The outer circumferential surface of the male screw portion 58 has a thread 58a.

The second bolt 53 is a circular-cross-section (in plan view) rod-shaped member having a male screw portion 59 at one end (at the left end in FIG. 7). The outer circumferential surface of the male screw portion 59 has a thread 59a. The second end of the second bolt 53 has a bolt head similar to the bolt head 55 provided at the one end of the first bolt 52.

The nut 54 is a circular-cross-section hollow cylindrical member. The nut 54 is formed such that the outside diameter is substantially the same as the inside diameter of the nut hole 2 from one end to the other end. That is, the nut 54 is formed so as to be (completely) fitted in the nut hole 2. The inner circumferential surface of the nut 54 has a thread 54a that is screwed onto the thread 58a of the male screw portion 58 and the thread 59a of the male screw portion 59.

The nut 54 supports the outer circumferential surfaces of the male screw portion 58 and the male screw portion 59 along the whole length of the male screw portion 58 and the male screw portion 59 (in the axial direction) and around the whole circumference of the male screw portion 58 and the male screw portion 59 (in the direction perpendicular to the axis).

The outside diameter of the nut 54 is set to be substantially the same as the inside diameter of the nut hole 2. The outer circumferential surface of the nut 54 and the inner circumferential surface of the nut hole 2 are each formed into a smooth bearing surface.

The fastening device 51 according to this embodiment is constructed such that the members that transmit a bolt tightening load, that is, the threads 54a, 58a, and 59a, are sufficiently away (separated) from the vicinity of the bolt head 55. The centrifugal force of the nut 54 having the thread 54a is supported by the bolt hole 56a provided in the fastened object 56 located next thereto (on the left) in FIG. 7. The other end of the second bolt 53 is constructed, for example, as shown in FIG. 4. The fastening load of the second bolt 53 is transmitted to the bolt 57 through the nut 54. The engagement between the thread 59a of the second bolt 53 and the thread 54a of the nut 54 and the engagement between the thread 58a of the bolt 57 and the thread 54a of the nut 54 are each so-called "engagement of the threads of the stud portions of a stud bolt", which allows the longitudinal load distribution of the screw to be made uniform as compared with a combination of a screw and a nut. In summary, when the screws of the bolts 52 and 53 are tapered as shown in FIG. 6, the load distribution can be made more uniform. The centrifugal force of the nut 54 is supported directly by the nut hole 2. Centrifugal forces that act on the bolts 52 and 53 are supported by the surface of the nut 54 fitted to the bolts 53 and 57 to some degree, and the remainder is transmitted to the nut 54 through the engagement surfaces of the threads 54a, 58a, and 59a.

A sixth embodiment of the fastening device of the present invention will be described with reference to FIGS. 8A and 8B.

The fastening device 61 of this embodiment is different from that of the first embodiment in that a first bolt 62 and a second bolt 63 are provided in place of the bolt 4 and a nut 64 is provided in place of the nut 5. The other components are the same as those of the first embodiment, so that descriptions of those components will be omitted here.

The same components as those of the first embodiment are given the same reference numerals.

Figure 8A:
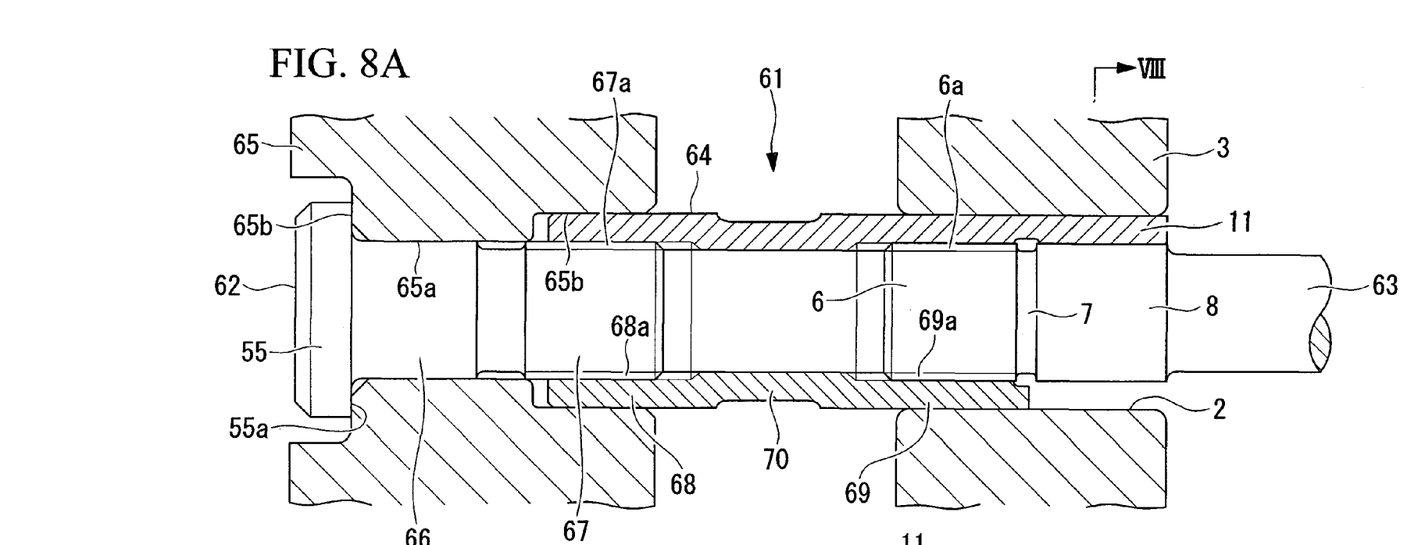
FIG. 8A is an enlarged sectional view of essential parts of a sixth embodiment of the fastening device of the present invention.
Figure 8B:
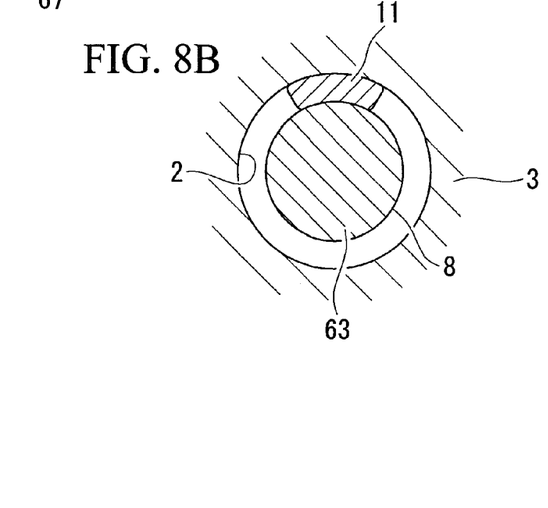
FIG. 8B is a cross-sectional view taken along line VIII-VIII of FIG. 8A.

The first bolt 62 is a circular-cross-section (in plan view) rod-shaped member having the bolt head 55 at one end (at the left end in FIG. 8A) and a fastened-object contact portion 66 that continues from the bolt head 55 and is to be fitted in a bolt hole 65a formed in a fastened object 65 and having a male screw portion 67 at the other end (at the right end in FIG. 8A). The fastened-object contact portion 66 is formed such that the outside diameter is substantially the same as the inside diameter of the bolt hole 65a from one end to the other end. The outer circumferential surface of the male screw portion 67 has a thread 67a.

The second bolt 63 is a circular-cross-section (in plan view) rod-shaped member having the male screw portion 6 at one end (at the left end in FIG. 8A), the constricted neck portion 7 that continues from the male screw portion 6, and the nut contact portion 8 that continues from the neck portion 7. The outer circumferential surface of the male screw portion 6 has the thread 6a. The other end of the second bolt 63 has a bolt head similar to the bolt head 55 provided at one end of the first bolt 62.

The nut contact portion 8 is formed such that the outside diameter is substantially the same as the outside diameter of the male screw portion 6 from one end to the other end.

The nut 64 is a circular-cross-section hollow cylindrical member having a first female screw portion 68 at one end thereof, a second female screw portion 69 at the other end, the tongue portion 11 that continues from the second female screw portion 69, and a joint portion 70 that joins (connects) the first female screw portion 68 and the second female screw portion 69 together.

The first female screw portion 68 is formed such that the outside diameter is substantially the same as the inside diameter of the nut hole 65b communicating with the bolt hole 65a and having an inside diameter larger than the inside diameter of the bolt hole 65a from one end to the other end. That is, one end of the nut 64 is formed so as to be fitted in the nut hole 65b. On the other hand, the second female screw portion 69 and the tongue portion 11 are formed such that the outside diameters are substantially the same as the inside diameter of the nut hole 2 from one end to the other end. That is, the other end of the nut 64 is formed so as to be fitted in the nut hole 2.

The inner circumferential surface of the first female screw portion 68 has a thread 68a that is to be screwed onto the thread 67a of the male screw portion 67. The inner circumferential surface of the second female screw portion 69 has a thread 69a that is to be screwed onto the thread 6a of the male screw portion 6.

The tongue portion 11 is an arc-shaped cross-section member having a substantially rectangular shape in plan view which supports the outer circumferential surface of the nut contact portion 8 along the whole length of the nut contact portion 8 (in the axial direction) and partially around the circumference of the nut contact portion 8 (in the direction perpendicular to the axis). When the first bolt 62, the second bolt 63, and the nut 64 are fastened together, the tongue portion 11 is located at the side at which the centrifugal force that acts on the second bolt 63 is received, that is, radially outside.

The curvatures of the outer circumferential surfaces of the first female screw portion 68, the second female screw portion 69, and the tongue portion 11 are set to be substantially the same as those of the inner circumferential surfaces of the nut holes 2 and 65b. The outer circumferential surface of the first female screw portion 68, the outer circumferential surface of the second female screw portion 69, the outer circumferential surface of the tongue portion 11, the inner circumferential surfaces of the nut holes 2 and 65b, the inner circumferential surface of the tongue portion 11, and the outer circumferential surface of the nut contact portion 8 are each formed into a smooth bearing surface.

The fastening device 61 of this embodiment is intended to obtain substantially the same advantages as the fastening device 51 shown in FIG. 7 by using the first bolt 62 which is shorter than the first bolt 52. The centrifugal force that acts on the nut 64 is supported by the bolt hole 65a of the fastened object 65 located at one end of the nut 64 and the nut hole 2 provided in the fastened object 3 located at the other end of the nut 64 and next to (on the right) in FIG. 8A. To put the first bolt 62 in a predetermined position, the fastened object 65 needs a space substantially equal to the length at the front. This embodiment is more advantageous than the embodiment described with reference to FIG. 7 because the first bolt 62 is shorter than the first bolt 52.

The fastening device of the present invention can be applied not only to the turbine section of the gas turbine described with reference to FIG. 1 but also to any components on which a centrifugal force acts in a direction substantially perpendicular to the longitudinal axis (the central axis) of the fastening device, such as the compressor of a gas turbine or the like.

What is claimed is:

1. A fastening device comprising:
an object to be fastened, having a nut hole;
a nut including a portion extending out of said nut hole and having, at one end, a female screw portion and a supporting portion to be fitted in the nut hole and configured such that the center of gravity is located in the nut hole; and
a bolt having a male screw portion to be screwed into the female screw portion and
at one end, a nut contact portion that is supported by the supporting portion, wherein
an inner circumferential surface of the supporting portion, and an outer circumferential surface of the nut contact portion are each formed into a smooth bearing surface.

2. The fastening device according to claim 1, wherein the supporting portion is provided continuously around the inner circumferential surface of the nut hole.

3. The fastening device according to claim 1, wherein the supporting portion is configured to be detachably attached to the female screw portion.

4. The fastening device according to claim 1, wherein the outer circumferential end of the female screw portion located in the vicinity of the beginning of the engagement between the female screw portion and the male screw portion is cut off so as to form a space between the outer circumferential surface and the inner circumferential surface of the nut hole.

5. A rotary machine equipped with the fastening device according to claim 1.

* * * * *